United States Patent Office 2,985,594
Patented May 23, 1961

2,985,594

ALKALI METAL ADDITION COMPOUNDS OF ALPHA-METHYL STYRENE AND METHOD OF MAKING

Robert L. Zimmermann, Midland, Mich., assignor to The Dow Chemical Company, Midland, Mich., a corporation of Delaware No Drawing. Filed Aug. 20, 1958, Ser. No. 756,072

7 Claims. (Cl. 252—431)

The invention relates to the preparation of new alkali metal addition compounds of alpha-methyl styrene and pertains especially to the sodium and/or potassium addition compounds of alpha-methyl styrene trimer to hexamer.

It is known that alkali metals will react with a wide variety of hydrocarbons under a wide variety of conditions. Schlenk and Bergmann (Annalen 463, pages 90–93, 1928) carried out the reaction of lithium with naphthalene and with diphenyl in ethyl ether, but the reaction was exceedingly slow. N. D. Scott et al., in J. Am. Chem. Soc., vol. 58, pages 2442–44 (1936), describe the making of the sodium addition compound of naphthalene in dimethyl ether or dimethyl ether of ethylene glycol as solvent and reaction medium. A. G. Brook et al. in J. Organic Chemistry, vol. 18, pages 447–463 (1953), describe the preparation of the sodium addition compound of 1-phenyl-2-methylpropene and the subsequent preparation of 2,2,3,3-tetramethyl-1,4-diphenyl adipic acid by reaction of the sodium addition compound with carbon dioxide and isolation of the reaction product. The obtaining of said acid in the reaction suggests that the sodium addition compound of 1-phenyl-2-methylpropene is a dimer of the formula $$C_6H_5 \cdot CHNa \cdot C(CH_3)_2 \cdot C(CH_3)_2 \cdot CHNa \cdot C_6H_5$$

It has now been found that alkali metal addition compounds, particularly sodium and/or potassium addition compounds of alpha-methyl styrene trimer to hexamer can readily be obtained by reaction of the alkali metal or an alloy of the metals with alpha-methyl styrene in an anhydrous ether solvent as hereinafter described.

It has further been discovered that the reaction of the alkali metal with the alpha-methyl styrene to form the dialkali metal addition compound of alpha-methyl styrene tetramer as the principal product of the reaction can readily be controlled by regulating the concentration of the alpha-methyl styrene in the ether solvent reaction medium and the carrying out of the reaction at a temperature above the ceiling temperature for the polymerization of the alpha-methyl styrene to high molecular weight polymers.

The term "ceiling temperature" employed herein means the temperature above which the polymerization of the alpha-methyl styrene does not proceed to form polymers of high molecular weight. The ceiling temperature is dependent upon the concentration of the monomeric alpha-methyl styrene in the reaction mixture and is defined by the equation:

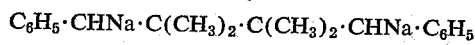

$$Tc = \frac{\Delta H}{\Delta S° + R \ln [m]}$$

wherein $Tc$ is the absolute temperature in degrees Kelvin, $\Delta H$ is the heat of polymerization of alpha-methyl styrene and is $-6.96$ kilocalories per mole, $\Delta S°$ is the corresponding entropy value of $-24.8$ calories per mole, $R$ is the gas constant and $m$ is the concentration of the alpha-methyl styrene in the ether solvent expressed in gram moles of the alpha-methyl styrene per liter of the solution. A method of determining the ceiling temperature for the polymerization of alpha-methyl styrene in tetrahydrofurane is described in J. Polymer Science, vol. 25, pages 488–490, September 1957. Upon placing the above values of $\Delta H$ and $\Delta S°$ in the equation and solving the latter, one finds that the ceiling temperature for the polymerization of alpha-methyl styrene at a given concentration in gram moles of the alpha-methyl styrene per liter of the ether solution is defined by the equation:

$$\frac{1}{Tc} = 0.00358 - 0.000661 \log [m]$$

Thus, the ceiling temperature can readily be determined for any given concentration of the alpha-methyl styrene in the ether solution.

The alkali metal can be sodium or potassium or an alloy or mixture of sodium or potassium. Alloys of approximately 30 percent by weight of potassium and 70 percent of sodium are preferred. The alkali metal can be employed in amounts corresponding to from 0.5 to 4, preferably from 1 to 4, gram atomic weights of the alkali metal per gram mole of the alpha-methyl styrene initially used.

The solvents to be employed in the reaction can be an aliphatic ether in which there is a $CH_3$—O— group such as dimethyl ether, methyl ethyl ether, methyl isopropyl ether, methyl butyl ether, methyl propyl ether, or dimethyl ether of ethylene glycol or a cyclic ether such as tetrahydrofurane or 1,4-dioxane.

The formation of the dialkali metal addition compounds of the alpha-methyl styrene trimers to hexamers, wherein the principal product of the reaction is the alkali metal addition compound of alpha-methyl styrene tetramer, is dependent upon the initial concentration of the alpha-methyl styrene in the ether solvent starting materials, and as previously mentioned, the carrying out of the reaction at a temperature above the ceiling temperature for the alpha-methyl styrene. The alpha-methyl styrene is employed in admixture with the ether solvent in a concentration of from 0.5 to 5, preferably from 0.5 to 3, gram moles of the alpha-methyl styrene per liter of the solution. Lower concentrations of the alpha-methyl styrene in the ether solvent starting materials results in the formation of the alkali metal addition compound of alpha-methyl styrene dimer.

The reaction can be carried out at temperatures between $-15$ and about 50° C., preferably at reaction temperatures within said range which are at least 10 degrees above the ceiling temperature of the alpha-methyl styrene, and at atmospheric pressure or thereabout.

In carrying out the reaction it is important that the reactants and the ether solvent be free or substantially free from impurities which react with the alkali metal addition compound or interfere with its formation and that the reaction be carried out in the absence of air, oxygen, water or carbon dioxide or other materials which react with and kill the alkali metal addition compound or inhibit or prevent its formation. It may be mentioned that known ways of purifying the reactants and solvent such as employing freshly distilled alpha-methyl styrene and ether solvent and carrying out of the reaction in an atmosphere of an inert gas, e.g. nitrogen or helium, are satisfactory.

In practice, a charge of the ether solvent in anhydrous or substantially anhydrous, e.g. freshly distilled, condition is placed in a suitable reaction vessel, preferably under an atmosphere of an inert gas such as nitrogen. The alkali metal or an alloy of sodium and potassium is added in the desired amount. The mixture is stirred. Thereafter, the alpha-methyl styrene is added in the desired proportion and the resulting mixture is maintained at the desired reaction temperature above the ceiling temperature for the alpha-methyl styrene. The reaction usually occurs at once and is readily observable by a change in color of the solution to a deep red. The reaction is continued for a period of from about 20 minutes to 5 hours or longer, but is usually complete in a period of from 0.5 to 3 hours.

The new compositions, consisting essentially of a solution of the sodium and/or potassium addition compounds of alpha-methyl styrene trimers to hexamers, wherein the principal product is the alkali metal addition compound of alpha-methyl styrene tetramer containing an average of two gram atomic weights of the alkali metal per four gram molecular weights of the alpha-methyl styrene dissolved in the ether solvent in which it is prepared, are stable compositions and are useful catalyst materials for the carrying out of the anionic polymerization of hydrocarbons containing conjugated double bonds at least one of which double bonds occurs in an aliphatic chain. They can be stored in the absence of air, oxygen, water or carbon dioxide for periods of several days, e.g. from one to three days, without appreciable loss in their catalytic activity. They are useful for the polymerization of hydrocarbons such as butadiene, isoprene, dimethylbutadiene, styrene, vinyltoluene, isopropylstyrene, tert.-butylstyrene or alpha-methyl styrene, in an anhydrous ether solvent to form polymers which possess a narrow molecular weight distribution and which polymers are "living" polymers, i.e. the terminal carbon atoms of the polymer chains are active carbanions which are capable of reacting with other materials such as water to form hydrocarbons, ethylene oxide to form the corresponding derivative having a 2-hydroxyethyl group of the formula $-CH_2 \cdot CH_2OH$ attached to the terminal carbon atoms of the polymer chain or with carbon dioxide to form the corresponding dicarboxylic acid derivative. The dialkali metal addition compounds of the alpha-methyl styrene tetramer can be reacted with water to form the corresponding hydrocarbon, with ethylene oxide to form the corresponding diol or with carbon dioxide to form the corresponding dicarboxylic acid. The new compositions are useful for a variety of purposes. The solutions of the dialkali metal addition compounds, consisting principally of the disodium and/or potassium addition compound of alpha-methyl styrene tetramer in the anhydrous ether solvent in which it is prepared, are particularly useful as catalyst materials for the carrying out of the anionic polymerization of aliphatic and/or aromatic hydrocarbons containing conjugated double bonds at least one of which double bonds occurs in an aliphatic chain to form polymers having for the most part a narrow molecular weight distribution or to form block polymers of the type . . . AAAAAABBBB . . . wherein block polymers composed of a predetermined number of said units A or B can readily be obtained.

The following examples illustrate ways in which the principle of the invention has been applied, but are not to be construed as limiting its scope.

Example 1

To a charge of 450 ml. of anhydrous freshly distilled tetrahydrofurane in a glass reaction vessel equipped with a stirrer, which flask was purged with nitrogen gas prior to placing the tetrahydrofurane therein, there was added 65 ml. of freshly distilled alpha-methyl styrene. The solution contained the alpha-methyl styrene in a 1.1 molar concentration. Thereafter, 15 grams of a sodium-potassium alloy, prepared by dissolving 60 parts by weight of potassium in 90 parts by weight of molten sodium under an inert oil and cooling the mixture, was added to the solution. The resulting mixture was stirred at room temperature (about 25° C.) for a period of 8 hours. The solution was a dark red color. A portion of the solution was titrated and found to be a 0.54 normal solution of the sodium-potassium alloy addition compound of alpha-methyl styrene tetramer.

The sodium-potassium alloy addition compound is a catalyst material for the anionic polymerization of unsaturated aliphatic or aromatic hydrocarbons containing conjugated double bonds at least one of which double bonds occurs in an aliphatic chain such as butadiene, styrene, isoprene, vinyltoluene, alpha-methyl styrene and the like.

Example 2

To a charge of 630 ml. of freshly distilled substantially anhydrous tetrahydrofurane there was added 195 ml. of freshly distilled alpha-methyl styrene and 55 grams of a sodium-potassium alloy similar to that employed in Example 1. The resulting mixture was stirred and maintained at a temperature of 25° C. for a period of 8 hours. The solution was a deep red color. A portion of the solution was titrated and found to be a 0.79 normal solution of the sodium-potassium alloy addition compound of alpha-methyl styrene tetramers to pentamers. The theoretical normality for the addition compound of alpha-methyl styrene tetramer is 0.9 normal.

Example 3

To a charge of 370 ml. of purified tetrahydrofurane there was added 130 ml. of alpha-methyl styrene and 35 grams of a sodium-potassium alloy similar to that employed in Example 1. The mixture was stirred at room temperature for a period of 8 hours. The solution was a deep red color. A portion of the solution was titrated and was found to be a 1.05-normal solution of the addition compound of alpha-methyl styrene tetramer.

Similar results are obtained when sodium or potassium are substituted for the sodium-potassium alloy employed in the example.

Example 4

A charge of 500 ml. of freshly distilled tetrahydrofurane was placed in a one liter glass reaction vessel under an atmosphere of nitrogen. Ten grams of sodium was added. The mixture was stirred and 35 ml. of freshly distilled alpha-methyl styrene was added. The resulting mixture was stirred at room temperature for a period of one hour. The solution was a deep red color. A portion of the solution was titrated and found to be a 0.25 normal solution of the di-sodium addition compound of alpha-methyl styrene tetramer. To a solution consisting of 2,000 ml. of tetrahydrofurane and 500 ml. of freshly distilled alpha-methyl styrene there was added dropwise about 7 ml. of the di-sodium alpha-methyl styrene tetramer solution until a red color was observed. Thereafter, 15 ml. more of the di-sodium alpha-methyl styrene tetramer solution was added as polymerization catalyst. The resulting mixture was stirred and maintained at a temperature of —60° C. for a period of one hour to polymerize the alpha-methyl styrene. Thereafter, a few drops of oxygen free water were added to the mixture to terminate the polymerization reaction. The polymer was recovered by evaporating the tetrahydrofurane solvent and unreacted monomer by heating the solution under vacuum until the residue was at a temperature of 175° C. at 5 millimeters absolute pressure. There was obtained 440 grams of polymerized alpha-methyl styrene. The product was a hard brittle solid at room temperature. The poly-alpha-methyl styrene had a viscosity characteristic of 16 centipoises determined for a 10 weight percent solution of the polymer in toluene at 25° C. The molecular weight distribution of the polymer was determined. It was found to be of narrow molecular weight distribution. The polymer was a thermoplastic resin and could readily be molded to form plastic articles such as plates, bars, rods, boxes, toys, combs, etc., useful for a variety of purposes.

I claim:

1. A method of effecting the addition of an alkali metal to alpha-methyl styrene to form the corresponding dialkali metal addition compounds of polymeric alpha-methyl styrene consisting of the trimers to hexamers, which method comprises reacting an alkali metal selected from the group consisting of sodium, potassium, alloys thereof and mixtures thereof, with alpha-methyl styrene by bringing the alpha-methyl styrene into contact with the alkali metal in a reaction medium comprising an ether selected from the group consisting of tetrahydrofurane, 1,4-dioxane and aliphatic ethers in which there is a $CH_3$—O— group, in proportions coresponding to from 0.5 to 4 gram atomic weights of said alkali metal per gram molecular proportion of the alpha-methyl styrene at temperatures between —15° and 50° C. and above the ceiling temperature for the alpha-methyl styrene as determined from the equation:

$$\frac{1}{Tc} = 0.00358 - 0.000661 \log [m]$$

wherein $Tc$ is the absolute temperature in degrees Kelvin and $m$ is the concentration of the alpha-methyl styrene in gram moles per liter of the ether solution, said alpha-methyl styrene being initially employed in a concentration corresponding to from 0.5 to 5 gram mole of the alpha-methyl styrene per liter of the ether solution.

2. A method according to claim 1, wherein the reaction is carried out at a temperature of at least 10° C. above the ceiling temperature for the alpha-methyl styrene.

3. A method according to claim 1, wherein the ether is tetrahydrofurane.

4. A method as claimed in claim 1, wherein the alkali metal is employed in proportions corresponding to from one to four gram atomic weights of the alkali metal per gram molecular proportion of the alpha-methyl styrene.

5. A reactive ether solution containing as the essential ingredients thereof the dialkali metal addition compound of polymeric alpha-methyl styrene consisting of the tri-mers to hexamers and resulting from the reaction of an alkali metal selected from the group consisting of sodium, potassium, alloys thereof and mixtures thereof, with alpha-methyl styrene in proportions coresponding to from 0.5 to 4 gram atomic weights of the alkali metal per gram molecular proportion of the alpha-methyl styrene in an ether solvent selected from the group consisting of tetrahydrofurane, 1,4-dioxane and aliphatic ethers in which there is a $CH_3$—O— group, at temperatures between —70° and 50° C. and above the ceiling temperature for the alpha-methyl styrene as determined from the equation $$\frac{1}{Tc} = 0.00358 - 0.000661 \log [m]$$

wherein $Tc$ is the absolute temperature in degrees Kelvin and $m$ is the concentration of the alpha-methyl styrene in gram moles per liter of the ether solution and said alpha-methyl styrene being initially employed in a concentration of from 0.5 to 5 gram mole of the alpha-methyl styrene per liter of the ether solution.

6. A reactive ether solution according to claim 5, containing as the essential ingredients the di-sodium-potassium alloy addition compound of polymeric alpha-methyl styrene consisting of the trimers to hexamers dissolved in a solvent consisting essentially of tetrahydrofurane.

7. A reactive ether solution according to claim 5, containing as the essential ingredients the di-sodium-potassium alloy addition compound of polymeric alpha-methyl styrene consisting of tetramer dissolved in a solvent consisting essentially of tetrahydrofurane.

References Cited in the file of this patent

UNITED STATES PATENTS

| | | |
|---|---|---|
| 2,816,913 | Frank | Dec. 17, 1957 |
| 2,816,914 | Frank | Dec. 17, 1957 |